United States Patent
Achilles et al.

(10) Patent No.: US 7,827,180 B2
(45) Date of Patent: Nov. 2, 2010

(54) METHODS AND APPARATUS FOR ASSIGNING CONTENT IDENTIFIERS TO CONTENT PORTIONS

(75) Inventors: Heather D. Achilles, Hudson, NH (US); Nicholas D. Matsakis, Zürich (CH); Patrick R. McManus, Boston, MA (US); Eugene Kuznetsov, Cambridge, MA (US)

(73) Assignee: Intenational Business Machines Corporation, Armonk, NY (US)

( * ) Notice: Subject to any disclaimer, the term of this patent is extended or adjusted under 35 U.S.C. 154(b) by 958 days.

(21) Appl. No.: 11/267,565

(22) Filed: Nov. 4, 2005

(65) Prior Publication Data

US 2006/0236227 A1 Oct. 19, 2006

Related U.S. Application Data

(60) Provisional application No. 60/625,260, filed on Nov. 5, 2004.

(51) Int. Cl.
*G06F 17/30* (2006.01)
(52) U.S. Cl. .................................. 707/741
(58) Field of Classification Search .................. 707/1, 707/741; 715/213
See application file for complete search history.

(56) References Cited

U.S. PATENT DOCUMENTS

| | | | |
|---|---|---|---|
| 2002/0016185 A1* | 2/2002 | Yuzawa | 455/556 |
| 2002/0022956 A1* | 2/2002 | Ukrainczyk et al. | 704/9 |
| 2006/0010150 A1* | 1/2006 | Shaath et al. | 707/102 |

* cited by examiner

*Primary Examiner*—James Trujillo
*Assistant Examiner*—Amresh Singh
(74) *Attorney, Agent, or Firm*—Chapin IP Law, LLC; Barry W. Chapin, Esq.

(57) ABSTRACT

A system assigns identities to received content portions by determining if the content portion has an assigned content identifier, and if so, applying the assigned content identifier to the content portion received. If the content portion does not have an assigned content identifier, the system selects an unassigned content identifier, from the set of unassigned content identifiers, for assignment to the content portion and assigns the unassigned content identifier to the content portion so that the unassigned content identifier becomes an assigned content identifier in a set of assigned content identifiers. The system associates a persistence metric to the assigned content identifier. The persistence metric indicates an importance of longevity of the assignment between the content portion and the content identifier. The system performs a recover operation to unassign content identifiers in the set of assigned content identifier based on a persistence metric of those assigned content identifiers.

24 Claims, 3 Drawing Sheets

METHODS AND APPARATUS FOR ASSIGNING CONTENT IDENTIFIERS TO CONTENT PORTIONS

CLAIM TO BENEFIT OF EARLIER FILED PROVISIONAL APPLICATION

This patent application claims the benefit of the filing date of the following co-pending United States Provisional Patent Application:

1) U.S. Provisional Patent Application entitled "METHODS AND APPARATUS FOR MANAGING QNAMES IN MARKUP LANGUAGE SYSTEMS", Filed Nov. 5, 2004, having Ser. No. 60/625,260. The entire teachings and contents of this provisional patent application are hereby incorporated by reference in their entirety.

RELATION TO CO-PENDING APPLICATIONS

This patent application relates to technology disclosed in the following Provisional and Utility patent applications:

1) U.S. Utility patent application entitled "METHODS AND APPARATUS FOR PROCESSING MARKUP LANGUAGE MESSAGES IN A NETWORK", Filed Dec. 22, 2003, having Ser. No. 10/745,326, 2) U.S. Utility patent application entitled "METHOD AND APPARATUS FOR PROCESSING MARKUP LANGUAGE INFORMATION", Filed Jul. 1, 2004, having Ser. No. 10/883,018, 3) U.S. Utility patent application entitled "METHODS AND APPARATUS FOR CONVERTING MARKUP LANGUAGE DATA TO AN INTERMEDIATE REPRESENTATION", Filed Jul. 1, 2004, having Ser. No. 10/883,484, 4) U.S. Utility patent application entitled "METHODS AND APPARATUS FOR CONVERTING A REPRESENTATION OF XML AND OTHER MARKUP LANGUAGE DATA TO A DATA STRUCTURE FORMAT", Filed Jul. 1, 2004, having Ser. No. 10/883,483, 5) U.S. Utility patent application entitled "METHOD AND APPARATUS FOR STREAM BASED MARKUP LANGUAGE POST-PROCESSING", Filed Jul. 1, 2004, having Ser. No. 10/883,016, Each of the above referenced applications is assigned to the same Assignee as the present application. The entire teachings, figures and contents of the above-identified applications are hereby incorporated by reference herein.

BACKGROUND

Modern computer systems process information in a variety of different data formats. Some data formats are markup language formats such as the Hypertext Markup Language (HTML) and the extensible markup language (XML). Such markup language data formats are text-based data formats. HTML is a markup language used for the representation of Web pages. XML is a widely adopted data encoding format and specification developed by the World Wide Wed Consortium (W3C). XML is a pared-down version of Standard Generalized Mark-Up Language (SGML), designed especially for creation and representation of Web documents. XML files, often referred to as documents, provide a text-based encoding format that enables a human to view the file and obtain an understanding of its contents. XML is also similar to the HTML that is used for the representation of Web pages since both use markup codes known as tags to identify specific data and attributes of that data. An XML document consists mainly of text and tags, and the tags imply a hierarchical tree structure upon the data contained in the XML document.

When computer systems process markup data formats such as XML for example, processing within such computer systems often converts text strings appearing within the data formats into numeric identifiers or codes that allow the computer system to perform more efficient processing on the data formats. As an example, in conventional XML processing software that operates in conventional computer systems, such software converts unique portions of XML text data such as XML tags or uniform resource identifiers (e.g., URLs) into uniquely encoded numbers sometimes referred to as QNAMES. QNAMEs are thus a unique numerical representation of a character string used to improve XML processing performance. To generate a QNAME, conventional software programs applying a hashing function or other processing to the unique text data to generate a unique numeric equivalent.

Once the conventional XML processing software has converted unique text strings in the markup language format into equivalent respective QNAMES, such software can then perform processing on the QNAMES rather than on the actual tag (i.e. text) corresponding to the QNAME. As noted above, one purpose for conversion of text strings to QNAMES is that computer systems are more efficient at processing numeric values rather than text data. As an example, the markup language processing software can perform operations such as comparisons on the unique numeric identifiers (i.e. QNAMES) in a more efficient manner that if applying equivalent processing to the text data associated with those numeric identifiers. As a result, processing of the markup language data is faster.

SUMMARY

Conventional mechanisms for associating unique content portions, such as text strings occurring within markup language data, with corresponding numeric content identifiers suffer from a variety of deficiencies. In particular, when processing markup language data and converting unique text strings such as tags or URIs into respectively unique numeric identifiers, a situation may arise in which the set of available numeric identifiers is not large enough to represent all content portions uniquely. In other words, as more and more different text strings are encountered and converted to content identifiers, the set of available content identifiers become smaller and smaller. Eventually, a situation can arise in which there are no more content identifiers available for assignment as numeric identifiers to individual respectively unique content portions such as text strings (e.g. tags or URIs).

The frequency of occurrence of such a problem is dependent upon factors such as the number of digits in the numeric identifier, as well as how many different content portions are received within the markup language data that is processed. As an example, if the maximum length of the numeric identifier is six digits, only one million different markup language content portions (0 through 999,999) can be represented before their are no more unique numeric identifiers available for representation of additionally encountered unique markup language content portions. Stated another way, because a QNAME is simply an integer, depending on the number of digits, there is an inherent limit to the number of unique QNAMEs that can exist for association to content portions. If a conventional computer system processes enough markup language documents, the limit on the number of QNAMES will eventually be reached and problems may arise without a system to recycle or recover previously assigned to QNAMES for reassignment to newly encountered content portions.

Embodiments disclosed herein are based in part on the observation that since many QNAMEs will only be used for a limited number of documents, it would be best if they could be reused after a document was complete or upon some other event such as a reduction in the number of available QNAMES below a threshold level. Unfortunately, conventional systems do not provide efficient mechanisms of keeping track of which QNAMEs are mapped to which documents and management of such issues effects performance of conventional applications.

Embodiments disclosed herein significantly overcome such difficulties and provide a content management process that provides a common pool of available numbers or other values, referred to herein as content identifiers, for assignment to content portions. As the system disclosed herein makes assignments of content identifiers to content portions, the content identifier (or the assignment between the content identifier and the content portion) is labeled with, or is assigned, a persistence metric. Generally, the persistence metric indicates how important the longevity of assignment should be between the content identifier and the content portion. The system disclosed herein can determine the persistence metric, for example, by the type of content being processed. Thus if the content management process disclosed herein is processing a markup language document such as a commonly used XML schema (e.g. that may be defined by a standards body such as the World Wide Web Consortium— W3C), the content management process can use a persistence metric associated to all content identifiers assigned to content portions for tags within that XML schema in order to identify that that tags or URIs within that XML schema are to be persistently assigned to those content identifiers. In certain configurations, there can be a range of values for persistence metrics and the assignment of content identifiers to certain (e.g. frequently occurring) content portions can permanent, semi-permanent, or the like, whereas assignment of content identifiers to other less frequently or randomly occurring content identifiers can be temporary.

During processing of the system disclosed herein, the content management process assigns identities to content portions as those content portions are received. After receiving a content portion, the system determines if the content portion has an already assigned content identifier. If so, the system applies the assigned content identifier to the content portion received to allow processing of that content portion using the assigned content identifier. If the content portion does not have an assigned content identifier, the system selects an unassigned content identifier, from a set of unassigned content identifiers, for assignment to the content portion. The system then assigns the unassigned content identifier to the content portion so that the unassigned content identifier becomes an assigned content identifier in a set of assigned content identifiers. The system further associates a persistence metric to the assigned content identifier that was assigned to the content portion. The persistence metric indicates an importance of longevity of the assignment between the content portion and the content identifier.

As more and more content identifiers are assigned to content portions in this manner, eventually the system will detect that a number of unassigned content identifiers in the set of unassigned content identifiers has been reduced below a threshold value due to selection and assignment of unassigned content identifiers to successively received or encountered content portions (e.g. encountered when processing XML documents). In such a case, the system disclosed herein performs a recover operation to unassign content identifiers in the set of assigned content identifiers. In the recover operation, the unassigned content identifiers that are subject to the recover operation again become part of the set of unassigned content identifiers (i.e., are made available for reassignment to newly received content portions).

The system as disclosed above is described herein as being implemented on a network device or computer having a processor, memory, and interface operable for performing the operations as disclosed herein. Specific configurations include a computerized device such as a computer system, central processing unit, microprocessor, controller, electronic circuit, application-specific integrated circuit, or other hardware device configured to process some or all of the operations disclosed herein. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein to allow execution of instructions in a computer program according to any suitable programming language or medium, as is known to those of skill in the art. In other words, a computer, processor or other electronic device that is programmed to operate as explained herein is itself considered an embodiment of the invention.

Other embodiments of the invention include a dedicated markup language processing device such as any type of computerized device, computer system, peripheral device (e.g., a circuit card or co-processor that can be installed into a computerized device for processing XML data, such as an XML co-processor), a network or data communications device, switch, router, dedicated XML processing device or the like configured with software and/or circuitry that implements a markup language processor that produces or processes the data format as summarized above and as explained in further detail below. Such a device can process any or all of the method operations disclosed herein as embodiments. Still other embodiments include software or firmware programs that can operate alone or in conjunction with each other in a computerized device to perform the method embodiment steps and operations summarized above and disclosed in detail below. Preferred operational embodiments are implemented in hardware for speed of processing however, though software implementations are considered to be embodiments as well.

One such software embodiment comprises a computer program product that has a computer-readable medium including computer program logic encoded thereon that, when performed in a computerized device having a coupling of a memory and a processor, programs the processor to perform the data format processing operations disclosed herein as embodiments of the invention to carry out TLV data format creation and processing on markup language data, such as XML or upon other markup languages. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC). The software or firmware or other such configurations can be installed onto the computerized device to cause the computerized device to perform the techniques explained herein as embodiments. Thus, encoded items alone, or software code written to processes such a data format upon any computer readable medium that contains instructions to carry out novel combinations of processing steps as explained herein, or any equivalents thereto, are considered embodiments.

It is to be understood that the system can be embodied strictly as a data format on a computer readable medium, a software program to produce or processes such a data format, as software and hardware, or as hardware alone (e.g., such as an XML co-processor on a chip, or in a circuit card, or as part of a network device).

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
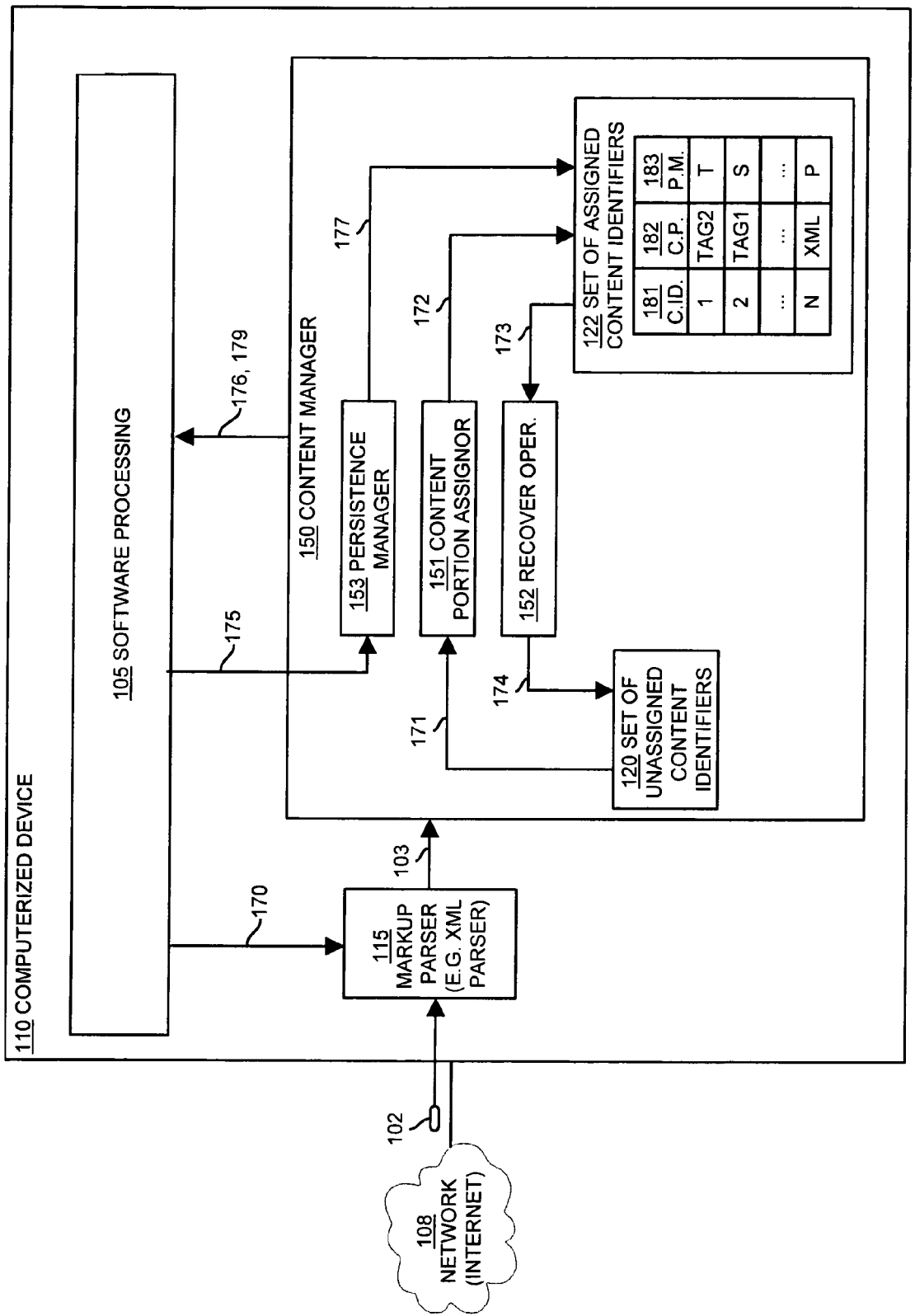
FIG. 1 illustrates an example of a computerized device including a content manager configured in accordance with embodiments of the invention.

FIG. 1 shows an example computing system environment 100 suitable for use in explaining configurations disclosed herein. The computing system environment 100 includes a network 101 such as the Internet or other wide or local area network that couples today computerized device 110 equipped with a content manager 150 configured in accordance with example embodiments of the invention. The computerized device 110 also includes a markup parser 115 such as an XML parser that parses markup content such as XML 102 received by the computerized device 110. The markup parser 115 is generally under the control 170 of software processing 105 that executes within the computerized device 110. As the markup parser 115 parses the markup content 102, content portions 103 such as tags and Uniform Resource Indicators (URI) are forwarded to the content manager 150. The content manager 150 operates a content portion assignor 151 that selects and assigns unassigned content identifiers 120 to receive content portions 103 for placement into a set of assigned content identifiers 122. Within the set of assigned content identifiers 122, the table or other data structure is maintained of respective assignments between content identifiers (Column 1 at 181) and content portions (Column 2 at 182). The set of assigned content identifiers 122 further includes an indication of respective persistent metrics (Column 3 at 183) associated with the assignments of the content identifiers 181 to content portions 182. As will be explained, the content manager 150 sets the persistent metrics 183 according to a persistent signal 175 that in this example is received from the software processing 105. Once content identifiers 181 are assigned to content portions 182 (that were received as content portions 103), the software processing 105 can process 176 those content portions 183 in accordance with (i.e., by referencing) respective assigned content identifiers 181.

Accordingly, as the content manager 150 makes assignments of unassigned content identifiers 122 to content portions 103 as they arrive, the content identifiers at location 181 (or the assignment between the content identifier and the content portion) is labeled with, or is assigned, a persistence metric 183 indicating how important the longevity of the assignment should be between the content identifier and the content portion. In this example, the persistence metrics 183 are shown by the letters "T", "S" or "P" to designate a temporary, semi-permanent or permanent assignment between a content identifier and a content portion. Thus in this example configuration, there are three levels, groups or "pools" of classifications of persistence metrics. It is to be understood that there can any number of different persistence metric values, each corresponding to a different level, pool or group of content identifiers. Different values for the persistence metric can corresponding to various things such as, for example, the type of data (i.e. the type of data in the content portion) to which the content identifier is associated, the type of document from which the content portion was obtained, a source or destination of the data (e.g. a computer on a network that provided the data), a user of the data, an application associated with the data, and the like. By having different persistence metric values, each corresponding to a different level or classification as noted above (e.g. each different value indicating a different source of the content portions), and by having content portions associated to content identifiers associated with a persistence metric having a value selected from one of the possible values, the persistence metric thus categorizes the association of the content identifier to the content portion and when a number of content identifiers begins to run low, content identifiers assigned to content portions that have specific persistence metrics can be selected for unassignment.

In one configuration, the system disclosed herein can determine the persistence metric, for example, by the type of content being processed and can receive the persistence signal 175 from the software processing 105 indicating such content type. Thus if the content manager 150 disclosed herein is processing a markup language document 102 such as a commonly used XML schema (e.g. that may be defined by a standards body such as the World Wide Web Consortium—W3C), the content manager 150 can use a "P" persistence metric 183 associated to all content identifiers 181 assigned to content portions 103 for tags within that XML schema in order to identify that that tags or URIs (collectively shown as content portions 103 in FIG. 1) within that XML schema 102 are to be persistently assigned to those content identifiers. Further details of processing operations that the content manager 150 performs will now be explained with reference to the flow charts of processing steps in FIG. 2.

Figure 2:
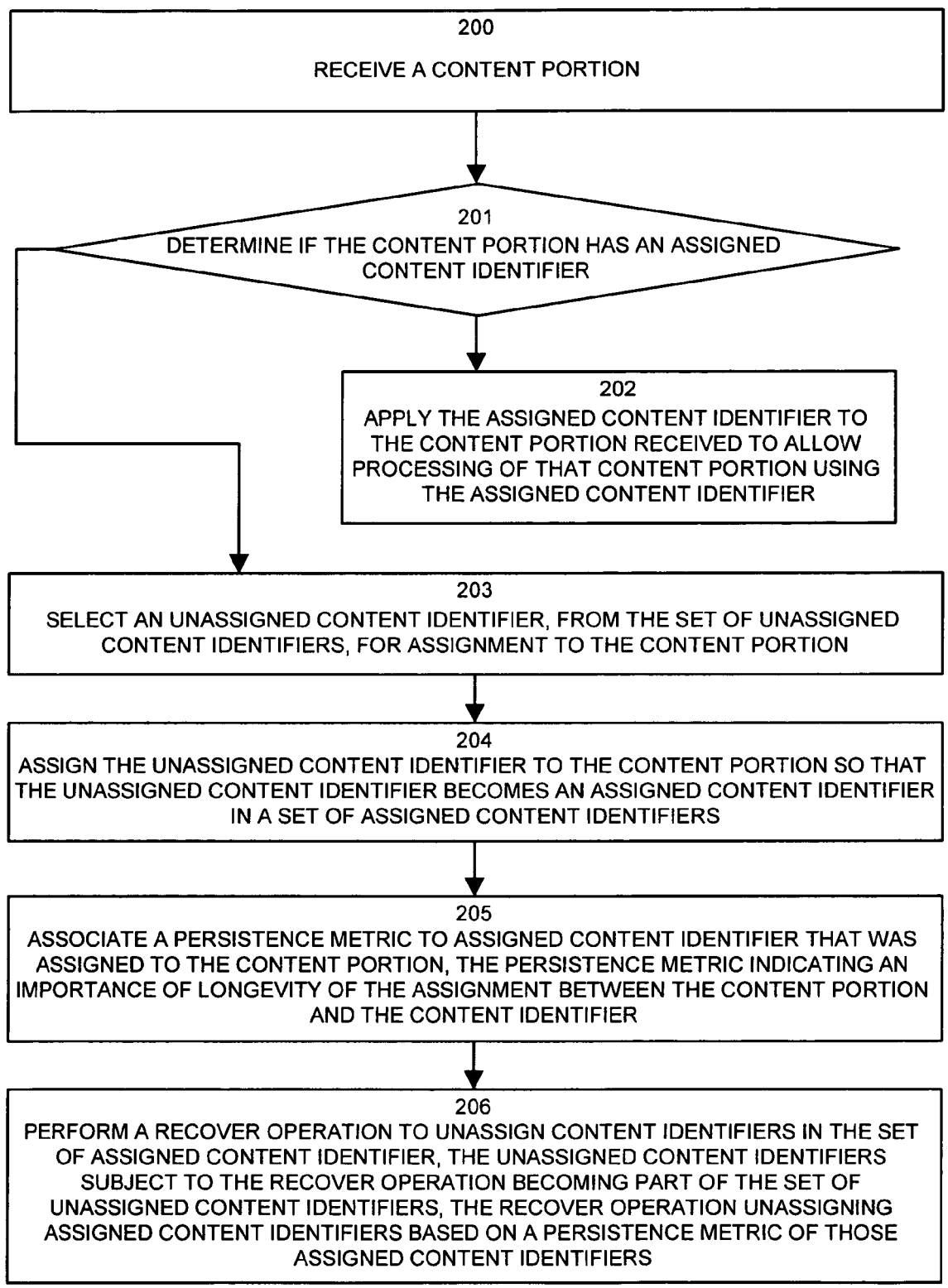
FIG. 2 is a flow chart of processing steps that a computerized device performs to process and associate content identifiers to content portions in accordance with example embodiments of the invention.

FIG. 2 is a flow chart of processing steps that the content manager 150 performs to assigns identities to content portions 103 in accordance with embodiments disclosed herein.

In step 200, the content manager 150 receives a content portion 103. This may include receiving content 102 in a markup language format and parsing the content in the markup language format via the markup parser 115 to obtain tokens from the content. The markup parser 115 identifies tokens that are either a markup language tag or a markup language uniform resource indicator (URI) as content portions 103 for application of processing by the content manager 150. During processing of a typical XML document 102, a stream of content portions 103 are continuously supplied to the content manager 150 for processing in accordance with operations explained herein.

In step 201, after receiving a content portion 103, the content manager 150 determines if the content portion 103 has an assigned content identifier 181. The content manager 150 can perform this processing by examining a table or other data structure within the set of assigned content identifiers 122. In particular, the content manager 150 can generate a numerical representation of the content portion 103, for example by application of a hash function, and can perform a lookup operation 177 to determine if the numerical representation of the content portion exists in a content identifier list 181 within the set of assigned content identifiers 122. If the content portion 103 already has an assigned content identifier 181, processing proceeds to step 202.

In step 202, if the content portion 103 already has an assigned content identifier 181, the content manager 150 applies the assigned content identifier 181 to the content portion 103 received to allow processing of that content portion using the assigned content identifier. In other words, the content manager 150 determines if the numerical representation of the content portion 103 exists in a content identifier list 181, and if so, returns 179 the content identifier 181 associated with the numerical representation of the content portion 181 (as shown in the content identifier list in the set of assigned content identifiers) to the software processing 105.

If the content portion 103 does not already have an assigned content identifier 181 from step 201, processing proceeds to step 203.

In step 203, if the content portion 103 does not have an assigned content identifier 181 in the set of assigned content identifiers 122, the content manager 150 selects an unassigned content identifier, from the set of unassigned content identifiers 120, for assignment to the content portion 103. In one configuration, the set of unassigned content identifiers 120 is one or more lists of available numbers that can be assigned to specific local portions of tags or URIs encountered in the XML stream 102. That is, there can be different lists of available or unassigned content identifiers within the set 120 based on the type of the content portion 103, such as a list for the local part of a tag definition and another list for the URI of that tag definition. The content manager 150 can determine a type of the content portion and based on the type of the content portion, can select an unassigned content identifier from a set of unassigned content identifiers associated that the type of the content portion. For example, the content manager 150 can determine if the content portion is a prefix content portion, a local content portion or a uniform resource indicator content portion from the markup language content 102. If the content portion is a prefix content portion, the content manager 150 can select an unassigned content identifier from a set of prefix unassigned content identifiers. If the content portion is a local content portion, the content manager 150 can select an unassigned content identifier from a set of local unassigned content identifiers. If the content portion is a uniform resource indicator content portion, the content manager 150 can select an unassigned content identifier from a set of uniform resource indicator unassigned content identifiers. It is to be understood that the set of available content identifiers can thus be a single set or multiple sets.

In step 204, the content manager 150 assigns the unassigned content identifier 120 to the content portion 103 (via operation of the content portion assignor 151 to create a new entry in the set of assigned content identifiers 122) so that the unassigned content identifier 120 becomes an assigned content identifier 181 in a set of assigned content identifiers 122.

In step 205, the content manager 150 associates a persistence metric 183 to the assigned content identifier 181 that was assigned to the content portion 182. The persistence metric indicates an importance of longevity of the assignment between the content portion 103 (182 in table) and the content identifier 181.

As more and more unassigned content identifiers 120 are assigned to content portions 103 in this manner, eventually the system will detect that a number of unassigned content identifiers in the set of unassigned content identifiers 120 has been reduced below a threshold value due to selection and assignment of unassigned content identifiers to successively received or encountered content portions (e.g. encountered when processing XML documents).

In such a case, in step 206, the content manager 150 performs a recover operation 152 (i.e., processing) to unassign content identifiers 181 in the set of assigned content identifiers 122 back to the set of unassigned content identifiers 120. The assigned content identifiers 181 subject to the recover operation 152 again become part of the set of unassigned content identifiers 120. As will be explained in more detail, the recover operation 152 unassigns assigned content identifiers 181 based on the persistence metric 183 of those assigned content identifiers 181.

In particular, during the recover operation, the content manager 150 transfers, based on respective persistence metrics 183 of content identifiers 181, less than all assigned content identifiers 181 in the set of assigned content identifiers 122 to the set of unassigned content identifiers 120 to allow those transferred content identifiers to be re-assigned or reused for newly received content portions 103. By transferring less than all, some content identifiers 181 (i.e. those with "P" permanent persistence metrics indicating a high importance of assignment between content identifiers and content portions) remain assigned to their respective content portions 182 in the set of assigned content identifiers 122 and are not recovered for reuse. In this manner, some assignments are cached more permanently that others (or indefinitely) to allow very commonly encountered content portions 103 (stored as 182 in table 122) such as standards-based XML tags to always have assigned content identifiers 181 for rapid processing of those tags or URIs.

Note that in one configuration, when recovering the content identifiers, the logic doing the recovery determines that the content identifiers it is recovering are not in use by another document. In this configuration, recover can be done after all document processing is complete, or document processing can be halted briefly after a document is finished being processed (i.e. before the next document is processed). In this manner, any document that is in process finishes processing and no new content portion data is processed until the content identifiers are recovered. This system is thus designed in this configuration not to recover an identifier that an active document is using because there could be an inconsistency in the identifier used for a given name. For example suppose content identifier "56" is used to represent (i.e., is associated with) content portion "fgh" and the system hit the threshold and recovery begins. During recovery, the content identifier "56" may get "recovered". However, if the document is has not completed processing, the next time the XML tag "fgh" comes in as a content portion, it may be assigned a new identifier—probably not "56". Thus by completing processing of any documents before performing the recover operation, the system can operate on content identifiers that are not currently in use.

Figure 3:
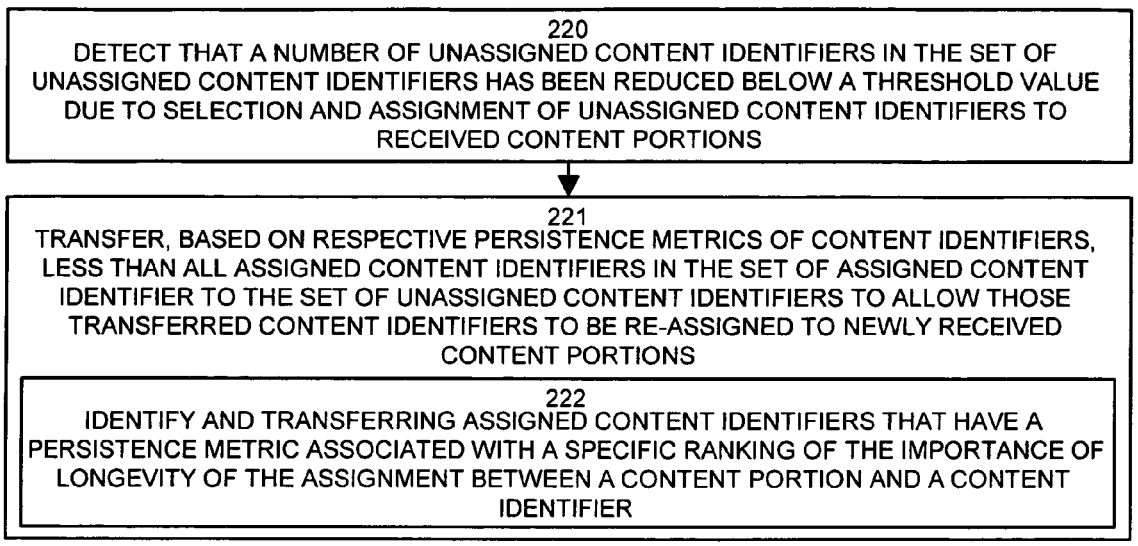
FIG. 3 is a flow chart of processing steps that shows details of the recover operation to unassign already assigned content identifiers from content portions.

FIG. 3 is a flow chart of processing steps that show details of content manager processing in order to perform the recover operation 152 to unassign assigned content identifiers 181 currently assigned to content portions 182.

In step 220, the content manager 150 detects that a number of unassigned content identifiers in the set of unassigned content identifiers 120 has been reduced below a threshold value due to selection and assignment of unassigned content identifiers to received content portions 103. As an example, if each content identifier 181 is a 16 bit number, there will be a maximum of sixty four thousand+/−available content identifiers that can be assigned to content portions 103. As more and more are assigned and are place in the table of assigned content identifiers 122, the remaining available content identifiers 120 will get smaller and smaller in number. At some threshold level, the content manager 150 can briefly halt processing of content portions 103 (e.g. the markup parser 115 can cache XML content for a brief period) while the recover operation 152 completes.

In step 221, in response the detecting that a number of unassigned content identifiers in the set of unassigned content identifiers 120 has been reduced below a threshold value, the content manager 150 transfers, based on respective persistence metrics 183 of content identifiers 181, less than all assigned content identifiers 181 in the set of assigned content identifiers 122 to the set of unassigned content identifiers 120 to allow those transferred content identifiers to be re-assigned to newly received content portions 103. Sub-step 22 shows details of this processing in accordance with one example configuration.

In sub-step 222, that content manager 150 identifies and transfers assigned content identifiers 181 that have a persistence metric 183 associated with a specific ranking (e.g. Temporary or Semi-permanent) of the importance of longevity of the assignment between a content portion 182 and a content identifier 181. In this configuration, the persistence metric 183 associated with assigned content identifiers 181 is either a permanent persistence metric indicating that an assignment between an assigned content identifier and a content portion is to be preserved during the recover operation, or is a non-permanent persistence metric indicating that an assignment between an assigned content identifier and a content portion can be subject to the recover operation 152. In one configuration, there can be multiple non-permanent persistence metrics. As an example, the non-permanent persistence metric can be a temporary persistence metric (e.g. "T") assigned to content identifiers associated with content portions that can be reassigned from the set of assigned content identifiers to the set of unassigned content identifiers upon each occurrence of the recover operations 52. Additionally, the non-permanent persistence metric can be a semi-permanent persistence metric (e.g. "S") associated to content identifiers 181 associated with content portions 182 that are only reassigned from the set of assigned content identifiers to the set of unassigned content identifiers upon each occurrence of the recover operation 152 if, after performing the recover operation 152 on the content identifiers 181 that have a temporary persistence metric T, does not yield a high enough number of unassigned content identifiers in the set of unassigned content identifiers 120.

In one example configuration, during the recover operation the system identifies and transfers assigned content identifiers that have a persistence metric associated with a specific ranking of the importance of longevity of the assignment between a content portion and a content identifier. The recover operation 152 thus removes any content identifiers 181 that have an associated temporary persistence metric and that are assigned to content portions 182 from those assignments and re-establishes those content identifiers (be placing them in the set 120) as being available for reassignment to newly received content portions 103. During the recover operation, the system only reassigns content identifiers 181 from the set of assigned content identifiers 122 that have a semi-permanent persistence metric "S" to the set of unassigned content identifiers 120 if, after performing the recover operation on the content identifiers that have a temporary persistence metric "T", it is determined that the recover operation on the temporary persistence metric content identifiers does not yield a high enough number of unassigned content identifiers in the set of unassigned content identifiers 120. In other words, in a configuration that uses permanent, semi-permanent and temporary persistence metrics for content identifiers, the recover operation first unassigns content identifiers associated to content portions that have a temporary persistence metric. If enough content identifiers are recovered, the recover operation is complete. However, if, after recovering content identifiers having a temporary persistence metric, it is determined that there are still not enough content identifiers available for reassignment to forthcoming content portions 103 that are to be received, the recover operation 152 can continue processing and can unassign content identifiers having a semi-permanent persistence metric in order to obtain additional recovered unassigned content identifiers for assignment to newly received content portions. By having different pools of content identifiers (i.e. tagged with different persistence metrics "T", "S" or "P" 183), permanent content identifiers are used for content portions found in long-lived documents, and the semi-permanent and temporary are persistence metrics are used to for content portions in more transient documents.

Examples of content identifiers of content portions having semi-permanent persistence metric assignments "P" are content portions in permanent documents such as XSLT stylesheets and compiled schema. An example of a permanent persistence content portion would be XML tags & URIs defined in various W3C specs. Like "xml" or "xsd" as a prefix. The URI: http://www.w3.org/2000/10/XMLSchema is another example. Examples of content identifiers of content portions having semi-permanent persistence metric assignments "S" are content portions in semi-permanent documents would include cached documents and perhaps cached XPATH expressions, etc. Examples of content identifiers of content portions having transient or temporary persistence metric assignments "T" are content portions in all other documents that happen to be processed.

Figure 4:
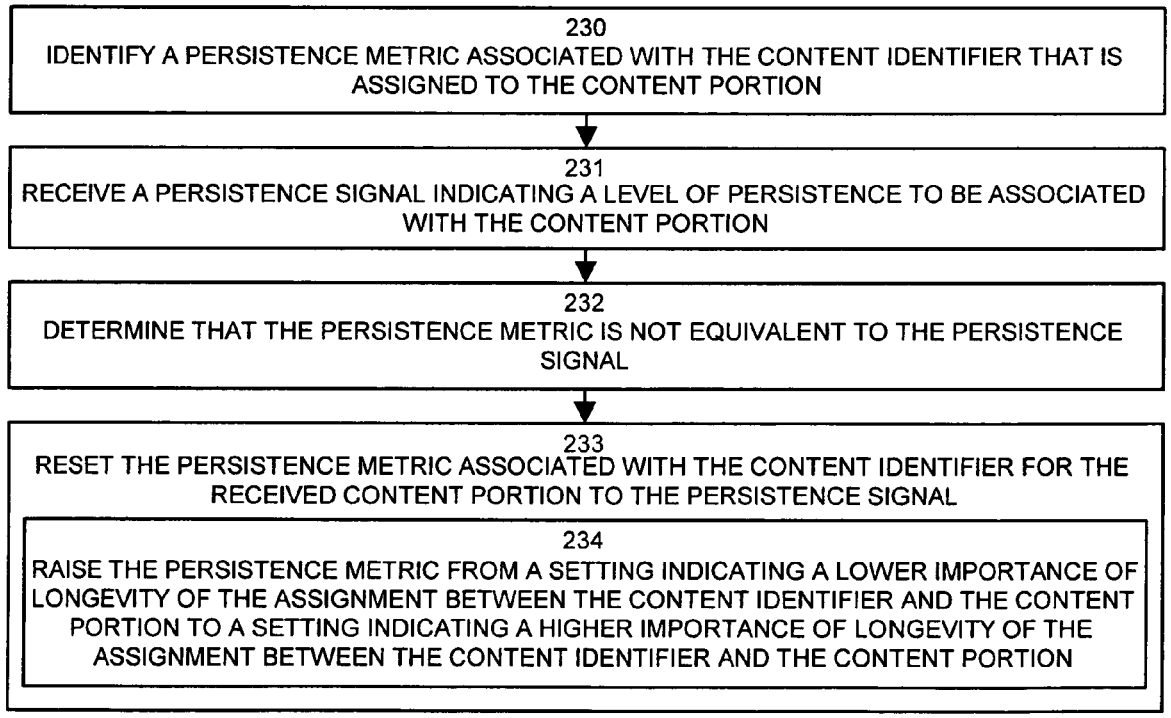
FIG. 4 is a flow chart of processing steps that shows details of processing to modify a persistence metric setting of an existing assignment between a content identifier and a content portion.

FIG. 4 is a flow chart of processing steps that shows how the persistence manager 153 can change a persistence metric of an assigned content identifier 181 from one value such as "T" to a new value such as "P". This processing occurs during the process of determining if the content portion has an assigned content identifier (i.e. within the processing path of steps 201 and 202 in FIG. 2. If the content portion 103 received already appears at location 182 in the set of assigned content identifiers, the content manager 150 can use the persistence manager 153 to confirm that the setting of the persistence metric 183 is correct.

As an example, in the system disclosed herein, content identifiers initially labeled as transient or temporary can be relabeled as semi-permanent. Thus if a given content identifier 181 (i.e., a QNAME) is initially assigned to a content portion 182 while parsing a transient document 102, but later the content portion 103 for that QNAME is encountered in a document 102 that is to be cached, the persistence adjuster 153 disclosed herein changes the value of the persistence metric 183 for that content portion 181 from temporary to semi-permanent in the set of assigned content identifiers 122. In one embodiment, this technique is implemented by using a single hash table 122 mapping string values to a structure. This technique lends itself to implementation in either hardware or software and can be used within systems described in the aforementioned co-pending patent applications.

In step 230, the persistence manager 153 identifies a persistence metric 183 associated with the content identifier 181 that is assigned to the content portion 182.

In step 231, the persistence manager 153 receives a persistence signal 175 (e.g., from software 105) indicating a level of persistence to be associated with the content portion 103.

In step 231, the persistence manager 153 determines that the already assigned persistence metric 183 is not equivalent to the persistence signal 175.

In step 232, in response, the persistence manager 153 resets the persistence metric 183 associated with the content identifier 181 for the received content portion 182 to the persistence signal value 175.

In one configuration, the persistence metric can be reset from temporary to semi-permanent (i.e., can be raised). As an example, in step 233, the persistence manager 153 raises the persistence metric 183 from a setting indicating a lower importance of longevity of the assignment between the content identifier and the content portion (e.g. from "T") to a setting indicating a higher importance of longevity of the assignment between the content identifier and the content portion (e.g., to "S" or "P"). In this manner, the persistence of assignments of content identifiers to content portions can change so that those content identifiers are not removed form the set of assigned content identifiers 122 during the recover operation. In an alternate configuration, the persistence metric can be lowered, such as by making a semi-permanent persistence metric a temporary persistence metric if a content portion is no longer going to be cached, for example.

Those skilled in the art will understand that there can be many variations made to the embodiments explained above while still achieving the same objective of those embodiments and the invention in general. As an example, it is to be understood that embodiments of the invention are not limited to processing XML markup language streams, but are applicable to processing any type of markup language format. In addition, embodiments may be implemented in hardware as a set of gates programmed into a microcontroller such as a Field Programmable Gate Array (FPGA) or equivalent device. In such an embodiment, a developer of a system including an embodiment of the invention embeds the method for processing markup language data as a series of logic instructions within a dedicated programmable microcontroller in hardware (as opposed to providing such instructions as software code that executes on a general purposes central processing unit). The programmable microcontroller may be a FPGA microchip that includes an input interface (e.g., a data bus or input pins into the chip) for receiving the character stream of markup language data and an output interface (e.g., an output bus, or set of pins, that may be the same as the input interface pins) for producing content identifiers for each respective content portion 103. The microcontroller can thus embody the content manager 150 and may include some or all of the computer readable medium as on-chip memory and can be included in the computerized device 110, that may be a dedicated markup language processing device. Accordingly, embodiments of the invention are not intended to be limiting to the aforementioned discussion, but rather, equivalents and variations now apparent to those skilled in the art from reading this disclosure of the aforementioned processing steps are intended to be included as embodiments of the invention as well.

What is claimed is:

1. A method for assigning identities to content portions, the method comprising:
    receiving a content portion;
    determining if the content portion has an assigned content identifier;
    if the content portion has an assigned content identifier:
        applying the assigned content identifier to the content portion received to allow processing of that content portion using the assigned content identifier;
        identifying a persistence metric associated with the content identifier that is assigned to the content portion;
        receiving a persistence signal indicating a level of persistence to be associated with the content portion; and
        determining that the persistence metric is not equivalent to the persistence signal, and in response, resetting the persistence metric associated with the content identifier for the received content portion to the persistence signal;
    if the content portion does not have an assigned content identifier:
        selecting an unassigned content identifier, from a set of unassigned content identifiers, for assignment to the content portion;
        assigning the selected unassigned content identifier to the content portion so that the unassigned content identifier becomes an assigned content identifier in a set of assigned content identifiers; and
        associating a persistence metric to the assigned content identifier, the persistence metric indicating an importance of longevity of the assignment between the content portion and the content identifier;
    wherein the persistence metric associated with assigned content identifiers comprises:
    at least one permanent persistence metric indicating that an assignment between an assigned content identifier and a content portion is to be preserved during a recover operation to unassign content identifiers; and
    wherein the content is in an extensible markup language format and wherein the content identifier is a QNAME.

2. The method of claim 1 comprising:
    performing the recover operation to unassign content identifiers in the set of assigned content identifier, the unassigned content identifiers subject to the recover operation becoming part of the set of unassigned content identifiers, the recover operation unassigning assigned content identifiers based on a persistence metric of those assigned content identifiers.

3. The method of claim 2 wherein performing the recover operation to unassign assigned content identifiers currently assigned to content portions comprises:
    detecting that a number of unassigned content identifiers in the set of unassigned content identifiers has been reduced below a threshold value due to selection and assignment of unassigned content identifiers to received content portions; and
    in response to detecting, transferring, based on respective persistence metrics of content identifiers, less than all assigned content identifiers in the set of assigned content identifier to the set of unassigned content identifiers to allow those transferred content identifiers to be re-assigned to newly received content portions.

4. The method of claim 3 wherein transferring, based on respective persistence metrics of content identifiers, less than all assigned content identifiers in the set of assigned content identifier to the set of unassigned content identifiers comprises:
identifying and transferring assigned content identifiers that have a persistence metric associated with a specific ranking of the importance of longevity of the assignment between a content portion and a content identifier.

5. The method of claim 4 wherein the persistence metric associated with assigned content identifiers further comprises:
at least one non-permanent persistence metric indicating that an assignment between an assigned content identifier and a content portion can be subject to the recover operation.

6. The method of claim 5 wherein the at least one non-permanent persistence metric includes:
a temporary persistence metric assigned to content identifiers associated with content portions that can be reassigned from the set of assigned content identifiers to the set of unassigned content identifiers upon each occurrence of the recover operation; and
a semi-permanent persistence metric associated to content identifiers associated with content portions that are only reassigned from the set of assigned content identifiers to the set of unassigned content identifiers upon each occurrence of the recover operation if, after performing the recover operation on the content identifiers that have a temporary persistence metric, does not yield a high enough number of unassigned content identifiers in the set of unassigned content identifiers.

7. The method of claim 2 wherein determining if the content portion has an assigned content identifier, and if so, applying the assigned content identifier to the content portion received to allow processing of that content portion using the assigned content identifier comprises:
generating a numerical representation of the content portion;
performing a lookup operation to determine if the numerical representation of the content portion exists in a content identifier list; and
if the numerical representation of the content portion exists in a content identifier list, assigning a content identifier associated with the numerical representation of the content portion in the content identifier list to the content portion.

8. The method of claim 2 wherein selecting an unassigned content identifier, from the set of unassigned content identifiers, for assignment to the content portion comprises:
determining a type of the content portion; and
based on the type of the content portion, selecting a content identifier from a set of unassigned content identifiers associated that the type of the content portion.

9. The method of claim 8 wherein determining a type of the content portion comprises:
determining if the content portion is at least one of a prefix content portion from markup language content, a local content portion from markup language content, and a uniform resource indicator content portion from a markup language content; and
wherein selecting a content identifier from a set of unassigned content identifiers associated that the type of the content portion comprises:
if the content portion is a prefix content portion, selecting an unassigned content identifier from a set of prefix unassigned content identifiers;
if the content portion is a local content portion, selecting an unassigned content identifier from a set of local unassigned content identifiers; and
if the content portion is a uniform resource indicator content portion, selecting an unassigned content identifier from a set of uniform resource indicator unassigned content identifiers.

10. The method of claim 2 wherein receiving a content portion comprises:
receiving content in a markup language format;
parsing the content in the markup language format to obtain tokens from the content; and
identifying tokens that are at least one of a markup language tag and a markup language uniform resource indicator as content portions for application of at least the operations of determining if the content portion has an assigned content identifier, selecting a new content identifier for the content portion, and assigning the new content identifier to the content portion.

11. The method of claim 1 wherein resetting the persistence metric associated with the content identifier for the received content portion to the persistence signal comprises:
raising the persistence metric from a setting indicating a lower importance of longevity of the assignment between the content identifier and the content portion to a setting indicating a higher importance of longevity of the assignment between the content identifier and the content portion.

12. A content manager configured with logic to assign identities to content portions, operation of the logic performing the processing operations of:
receiving a content portion;
determining if the content portion has an assigned content identifier;
if the content portion has an assigned content identifier:
applying the assigned content identifier to the content portion received to allow processing of that content portion using the assigned content identifier;
identifying a persistence metric associated with the content identifier that is assigned to the content portion;
receiving a persistence signal indicating a level of persistence to be associated with the content portion; and
determining that the persistence metric is not equivalent to the persistence signal, and in response, resetting the persistence metric associated with the content identifier for the received content portion to the persistence signal;
if the content portion does not have an assigned content identifier, selecting an unassigned content identifier, from a set of unassigned content identifiers, for assignment to the content portion;
assigning the selected unassigned content identifier to the content portion so that the unassigned content identifier becomes an assigned content identifier in a set of assigned content identifiers; and
associating a persistence metric to the assigned content identifier, the persistence metric indicating an importance of longevity of the assignment between the content portion and the content identifier;
wherein the persistence metric associated with assigned content identifiers comprises:
at least one permanent persistence metric indicating that an assignment between an assigned content identifier and a content portion is to be preserved during a recover operation to unassign content identifiers; and
wherein the content is in an extensible markup language format and wherein the content identifier is a QNAME.

13. The content manager of claim 12, wherein logic that performs the recover operation, includes logic performing the processing operations of:
   performing the recover operation to unassign content identifiers in the set of assigned content identifier, the unassigned content identifiers subject to the recover operation becoming part of the set of unassigned content identifiers, the recover operation unassigning assigned content identifiers based on a persistence metric of those assigned content identifiers.

14. The content manager of claim 13 wherein the logic that performs the operation of performing the recover operation to unassign assigned content identifiers currently assigned to content portions includes logic that performs the operations of:
   detecting that a number of unassigned content identifiers in the set of unassigned content identifiers has been reduced below a threshold value due to selection and assignment of unassigned content identifiers to received content portions; and
   in response the detecting, transferring, based on respective persistence metrics of content identifiers, less than all assigned content identifiers in the set of assigned content identifier to the set of unassigned content identifiers to allow those transferred content identifiers to be re-assigned to newly received content portions.

15. The content manager of claim 14 wherein the logic that performs the operation of transferring, based on respective persistence metrics of content identifiers, less than all assigned content identifiers in the set of assigned content identifier to the set of unassigned content identifiers includes logic that performs the operation of:
   identifying and transferring assigned content identifiers that have a persistence metric associated with a specific ranking of the importance of longevity of the assignment between a content portion and a content identifier.

16. The content manager of claim 13 wherein the logic that performs the operation of determining if the content portion has an assigned content identifier, and if so, applying the assigned content identifier to the content portion received to allow processing of that content portion using the assigned content identifier comprises logic that performs the operations of:
   generating a numerical representation of the content portion;
   performing a lookup operation to determine if the numerical representation of the content portion exists in a content identifier list; and
   if the numerical representation of the content portion exists in a content identifier list, assigning a content identifier associated with the numerical representation of the content portion in the content identifier list to the content portion.

17. The content manager of claim 13 wherein the logic that performs the operation of selecting an unassigned content identifier, from the set of unassigned content identifiers, for assignment to the content portion comprises logic that performs the operations of:
   determining a type of the content portion; and
   based on the type of the content portion, selecting a content identifier from a set of unassigned content identifiers associated that the type of the content portion.

18. The content manager of claim 17 wherein the logic that performs the operation of determining a type of the content portion comprises logic that performs the operations of:
   determining if the content portion is at least one of a prefix content portion from markup language content, a local content portion from markup language content, and a uniform resource indicator content portion from a markup language content; and
   wherein selecting a content identifier from a set of unassigned content identifiers associated that the type of the content portion comprises:
   if the content portion is a prefix content portion, selecting an unassigned content identifier from a set of prefix unassigned content identifiers;
   if the content portion is a local content portion, selecting an unassigned content identifier from a set of local unassigned content identifiers; and
   if the content portion is a uniform resource indicator content portion, selecting an unassigned content identifier from a set of uniform resource indicator unassigned content identifiers.

19. The content manager of claim 13 wherein the logic that performs the operation of receiving a content portion comprises logic that performs the operations of:
   receiving content in a markup language format;
   parsing the content in the markup language format to obtain tokens from the content; and
   identifying tokens that are at least one of a markup language tag and a markup language uniform resource indicator as content portions for application of at least the operations of determining if the content portion has an assigned content identifier, selecting a new content identifier for the content portion, and assigning the new content identifier to the content portion.

20. The content manager of claim 12 wherein the at least one non-permanent persistence metric includes:
   a temporary persistence metric assigned to content identifiers associated with content portions that can be reassigned from the set of assigned content identifiers to the set of unassigned content identifiers upon each occurrence of the recover operation; and
   a semi-permanent persistence metric associated to content identifiers associated with content portions that are only reassigned from the set of assigned content identifiers to the set of unassigned content identifiers upon each occurrence of the recover operation if, after performing the recover operation on the content identifiers that have a temporary persistence metric, does not yield a high enough number of unassigned content identifiers in the set of unassigned content identifiers.

21. The content manager of claim 12 wherein the logic that performs the operation of resetting the persistence metric associated with the content identifier for the received content portion to the persistence signal comprises logic that performs the operation of:
   raising the persistence metric from a setting indicating a lower importance of longevity of the assignment between the content identifier and the content portion to a setting indicating a higher importance of longevity of the assignment between the content identifier and the content portion.

22. A method for assigning identities to content portions, the method comprising:
   receiving a content portion;
   determining if the content portion has an assigned content identifier;
   if the content portion has an assigned content identifier:
   applying the assigned content identifier to the content portion received to allow processing of that content portion using the assigned content identifier;
   if the content portion does not have an assigned content identifier:

selecting an unassigned content identifier, from a set of unassigned content identifiers, for assignment to the content portion;

assigning the selected unassigned content identifier to the content portion so that the unassigned content identifier becomes an assigned content identifier in a set of assigned content identifiers; and associating a persistence metric to the assigned content identifier, the persistence metric indicating an importance of longevity of the assignment between the content portion and the content identifier;

wherein the persistence metric associated with assigned content identifiers comprises:

at least one permanent persistence metric indicating that an assignment between an assigned content identifier and a content portion is to be preserved during a recover operation to unassign content identifiers;

at least one non-permanent persistence metric indicating that an assignment between an assigned content identifier and a content portion can be subject to the recover operation; and wherein the content is in an extensible markup language format and wherein the content identifier is a QNAME and the content portion is one of:

a uniform resource indicator content portion;

and an XML tag.

23. The method of claim 22 comprising:

performing the recover operation to unassign content identifiers in the set of assigned content identifier, the unassigned content identifiers subject to the recover operation becoming part of the set of unassigned content identifiers, the recover operation unassigning assigned content identifiers based on a persistence metric of those assigned content identifiers.

24. The method of claim 23 wherein performing the recover operation to unassign assigned content identifiers currently assigned to content portions comprises:

detecting that a number of unassigned content identifiers in the set of unassigned content identifiers has been reduced below a threshold value due to selection and assignment of unassigned content identifiers to received content portions; and in response to detecting, transferring, based on respective persistence metrics of content identifiers, less than all assigned content identifiers in the set of assigned content identifier to the set of unassigned content identifiers to allow those transferred content identifiers to be re-assigned to newly received content portions.

* * * * *